G. CUSTER.
Cotton-Picker.
No. 205,058. Patented June 18, 1878.
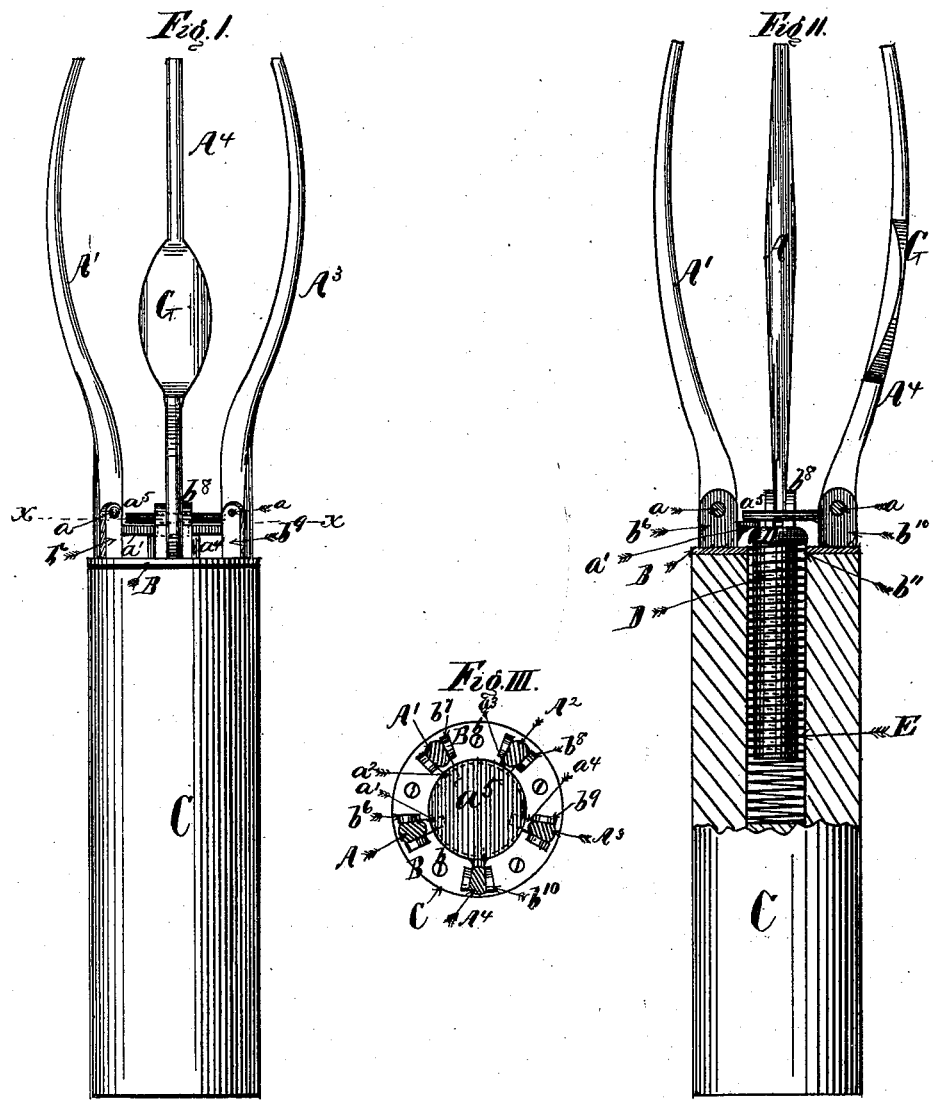

UNITED STATES PATENT OFFICE.

GEORGE CUSTER, OF BREMOND, TEXAS.

IMPROVEMENT IN COTTON-PICKERS.

Specification forming part of Letters Patent No. 205,058, dated June 18, 1878; application filed March 15, 1878.

*To all whom it may concern:*

Be it known that I, GEORGE CUSTER, of Bremond, in the county of Robertson and State of Texas, have invented a new and useful Improvement in Cotton-Pickers; and I do hereby declare that the following is a full, clear, and exact description of the same, reference being had to the accompanying drawing, forming a part of this specification.

The object of my invention is to produce a simple, effective, and easily-operated cotton-picker.

My invention consists in pivoting five (more or less) picker arms or fingers to a circular plate, which is placed on the upper end of a wooden handle. The lower ends of these arms or fingers are provided with lugs, which extend a short distance inward toward the center of the circular plate; and these lugs are acted upon from the under side by a spring-pusher placed within the handle, which causes the upper ends of the picker arms or fingers to stand open or out from each other. One of these picker arms or fingers is provided with a thumb-rest, and also with a lug, which covers the top of the spring-pusher and the short lugs of the other arms or fingers, and serves to press down said lugs and pusher, in order to bring together the upper end of the picker arms or fingers.

In order to describe my invention more fully, I refer to the accompanying drawing, of which—

Figure 1 is a side view of my improved cotton-picker. Fig. 2 is a sectional view. Fig. 3 is a plan sectional view taken on line $x\,x$, Fig. 1.

A, $A^1$, $A^2$, $A^3$, and $A^4$ are the picker arms or fingers, pivoted by pins $a$ to lugs or uprights $b^6$, $b^7$, $b^8$, $b^9$, and $b^{10}$ on the circular plate B, which is secured to the upper end of the handle C by screws $b$. $a^1$, $a^2$, $a^3$, and $a^4$ are short lugs formed on the lower end of the picker-arms A, $A^1$, $A^2$, and $A^3$. D is a vertical pusher placed in the center of the handle C, and extending up through hole $b^8$ in the plate B against the under side of the lugs $a^1$, $a^2$, $a^3$, and $a^4$. This pusher is habitually forced upward by a spiral spring, E.

The arm $A^4$ is provided with a somewhat larger lug, $a^5$, which is placed above the lugs of the other arms and directly over the pusher D. G is a thumb-piece, placed on the arm $A^4$.

The object of the pusher D is to automatically open and keep open the upper end of the picker arms or fingers, so that the picker may always be ready for use.

To use my invention, take the handle in the hand and pass the open ends of the picker arms or fingers over the cotton to be picked. Then press the thumb upon thumb-piece G, which will press the lug $a^5$ down upon the short lugs $a^1$, $a^2$, $a^3$, and $a^4$ and force them down with the pusher D, thereby causing the upper ends of the arms to press themselves tightly around the cotton-bulb, which then can be easily removed from the leaves by a sudden pull. By releasing the pressure of the thumb upon the thumb-piece the picker is again ready for use.

Having thus described my invention, I desire to claim—

1. The spring-pusher D, in combination with the lugs $a^1$, $a^2$, $a^3$, $a^4$, and $a^5$, arms A, $A^1$, $A^2$, $A^3$, and $A^4$, plate B, and handle C, substantially as and for the purpose set forth.

2. The arm $A^4$, with lug $a^5$ and thumb-piece G, in combination with the lugs $a^1\,a^2\,a^3\,a^4$, pusher D, and arms A $A^1\,A^2\,A^3$, substantially as and for the purpose set forth.

This specification signed this 25th day of February, 1878.

GEO. CUSTER.

Witnesses:
McB. HEARN,
O. C. MARSHEAL.